United States Patent [19]

Jackson et al.

[11] Patent Number: 5,073,692

[45] Date of Patent: Dec. 17, 1991

[54] AUTOMATIC WELDING ELECTRODE CAP CHANGER

[76] Inventors: Donald T. Jackson, 1159 Ashley, Troy, Mich. 48098; Joel D. Robinson, 6573 Noble Rd., West Bloomfield, Mich. 48322

[21] Appl. No.: 611,790

[22] Filed: Nov. 13, 1990

[51] Int. Cl.⁵ .............................................. B23K 11/30
[52] U.S. Cl. ................................. 219/86.8; 219/86.7
[58] Field of Search .................. 219/86.1, 86.25, 86.7, 219/86.8

[56] References Cited

U.S. PATENT DOCUMENTS

| | | | |
|---|---|---|---|
| 2,476,454 | 7/1949 | Reed | 219/4 |
| 4,400,607 | 8/1983 | Wakou et al. | 219/86.8 |
| 4,409,464 | 10/1983 | Favareto et al. | 219/136 |
| 4,794,221 | 12/1988 | Takabe et al. | 219/86.8 |
| 4,910,373 | 3/1990 | Fuse | 219/86.8 |

FOREIGN PATENT DOCUMENTS

| | | | |
|---|---|---|---|
| 3515597 | 10/1986 | Fed. Rep. of Germany | 219/86.8 |
| 1192924 | 11/1985 | U.S.S.R. | 219/86.8 |
| 1214361 | 2/1986 | U.S.S.R. | 219/86.8 |

Primary Examiner—Clifford C. Shaw
Attorney, Agent, or Firm—Basile and Hanlon

[57] ABSTRACT

An electrode cap mounting station includes a linearly reciprocal drive member. Two electrode cap engaging members, each having opposed facing knife edges, are arranged in inverted relationship with respect to each other and pivotally connected at one end to a body surrounding the linear drive member. Each electrode cap engaging member includes at least one cam. Cam follower members mounted on the linear drive member engage the cams during reciprocal movement of the drive member to pivot the electrode cap engaging members from an open, spaced apart position to a closed position in which the opposed knife edges engage the joint between an electrode cap and a welding electrode on which the cap is mounted to forcibly separate the electrode cap from the welding electrode. In an electrode cap mounting station, a similar linear drive member pivots first and second electrode cap mounting members. The electrode cap mounting apparatus is substantially identical to the electrode cap removing apparatus. At least one chute carries a plurality of new electrode caps. Movement of the welding electrode into the mounting station urges the discharge end of the chute into alignment with one of the first and second electrode cap mounting members. Pivotal movement of the first and second electrode cap mounting members to the second position forcibly urges a new electrode cap from the discharge end of the chute onto a welding electrode.

22 Claims, 8 Drawing Sheets

AUTOMATIC WELDING ELECTRODE CAP CHANGER

BACKGROUND OF THE INVENTION

1. Field of the Invention

The present invention relates, in general, to resistance spot welding apparatus and methods and, specifically, to resistance spot welding electrode caps.

2. State of the Art

In resistance spot welding operations on metal parts, electrode assemblies including! electrode arms, shanks and replaceable electrode caps are movably mounted with respect to each other so as to contact the metal parts and supply electric current therethrough to form resistance spot welds. The end diameter or the contact surface of the electrode cap which contacts the metal part is one of the critical factors in forming a quality, high strength spot weld.

In manufacturing operations, it is common for a single welding gun to perform numerous spot welding operations. Due to the high contact forces involving in such welding operations, the end diameter or contact surface of the electrode caps gradually enlarges or "mushrooms". This increases the end diameter or contact surface and thereby decreases the current density as a spot weld is formed in the metal parts. If the end diameter becomes too large, current density will fall below a critical value and result in a low strength, weak weld.

Thus, it is necessary for the electrode caps to be frequently replaced with new caps having the proper end diameter or dressed manually by use of a file or other grinding implement to restore the end diameter to the proper size. Both replacement and dressing are labor intensive which creates additional problems besides the need for a skilled maintenance repairman. Due to typical high production rates, there is often not enough time between each welding gun cycle for a maintenance repairman to replace or manually dress the electrode caps on a welding gun. Thus, such repair is frequently postponed until normal production down time. However, due to the constant, gradual enlarging or mushrooming of the electrode caps, this delay in replacing or dressing the caps to the proper size could result in numerous low strength, weak welds which directly affects product quality.

If the electrode caps are replaced or manually dressed on the welding gun at the required time during production, the time required to replace or dress the electrode caps could result in an interruption of the production line thereby effecting hundreds of workers and lowering production rates.

In an effort to minimize the manual labor required to replace or dress welding electrode caps and to alleviate the possibility of production stoppages, an automatic electrode cap exchanging apparatus has been proposed in U.S. Pat. No. 4,794,221. In this apparatus, a knife tool is mounted on one end of a shaft rotatably mounted on a base. A swinging lever is connected to one end of the shaft to rotate the shaft about its axis. The knife tool engages an annular groove or recess formed at the end of the electrode shank between the main portion of the electrode shank and the electrode cap. Rotation of the knife tool by activation or rotation of the shank generates a twisting action in the knife tool which separates and removes the electrode cap from the electrode shank.

This patent also describes the use of an electrode cap holder containing two adjacent rows of outwardly facing new electrode caps which are located adjacent to the knife tool. A robot welder which carries the welding electrode assembly moves the electrode assembly from the knife tool to the holder. The electrode shanks of the welding gun are then activated and moved toward each other to forcibly engage new electrode caps in the holder.

Although this electrode cap exchanging apparatus eliminates the need for manual labor in replacing electrode caps and minimizes the possibility of production stoppages or down time due to the fast operating cycle of the apparatus and the robot welder, it contains design features which could prevent its widespread use on most commonly employed welding electrode assemblies. The welding electrode assembly employed by the electrode cap changing apparatus in this patent is specifically designed to create an annular groove or recess between the inner end of the electrode cap and an adjacent shoulder on the electrode shank. This provides a readily accessible space for the knife tool to engage the electrode shank. However, a large number of electrode assemblies employed in certain industries, such as the automobile industry, utilize a welding electrode design which does not have an annular groove between the inner end of the electrode cap and the shoulder on the electrode shank. In these welding electrode configurations, the inner end of the electrode cap is disposed in registry or contact with the shoulder on the electrode shank. Since the knife tool disclosed in the above-described patent moves only through a rotation or twisting action, it does not have sufficient force to engage the joint between the registered electrode cap end shank so as to separate the electrode cap from the shank in these particular electrode assembly configurations.

Thus, it would be desirable to provide a resistance spot welding electrode cap changer which automatically removes a worn electrode cap from an electrode shank and mounts a new electrode cap on the shank. It would also be desirable to provide a resistance spot welding electrode cap changer which eliminates the need for manual labor required to replace or dress worn electrode caps. It would also be desirable to provide a resistance spot welding electrode changer in which the replacement of worn electrode caps with new caps is done in a short amount of time so as to minimize any production stoppages. It would also be desirable to provide a resistance spot welding electrode cap changer which can be used in conjunction with a robot, multi-axis welding apparatus.

SUMMARY OF THE INVENTION

The present invention is an automatic welding electrode cap changer. The cap changer includes at least one and preferably both of an electrode cap removing apparatus and an electrode cap mounting apparatus.

The electrode cap removing apparatus comprises a body having a through bore. A linear drive means having a reciprocally extendible and retractable drive member is attached to the body, with the drive member reciprocally extending through the bore therein. First and second electrode cap engaging means, each having first and second ends, are arranged in opposed, inverted positions with respect to each other and are pivotally connected together at the first ends to the linear drive member. First and second cams are formed in the first and second electrode cap engaging means, respectively. The first and second cams are disposed in opposed, inverted relationship with respect to each other.

Cam follower means are mounted on the linear drive member and engage the first and second cam means to pivot the first and second electrode cap engaging means between a first, spaced apart, position and a second, closed position as the linear drive member reciprocates. Each of the first and second electrode cap engaging means includes a knife edge, with the knife edges in the first and second electrode cap engaging means being opposed with respect to each other. In this manner, as the first and second electrode cap engaging means pivot to the second position, the opposed knife edges forcibly engage the joint between an electrode cap and the electrode shank to forcibly separate the electrode cap from the electrode shank.

In a preferred embodiment, the first and second electrode cap engaging means each comprise a pair of arms. Separate cam means are formed in each of the arms, with each of the arms being pivotally connected at a first end to the body. A cross member extends between the opposite ends of each of the arms and carries the knife edges. The linear drive means preferably comprises a fluid operated cylinder having a reciprocal cylinder rod.

The electrode cap mounting means comprises a similar body, linear drive means, first and second electrode cap engaging means, each having cam means and an electrode cap engaging surface or member. Cam follower means mounted on the linear drive member engage the cams and pivot the first and second electrode cap mounting means from a first, spaced apart position to a second, electrode cap engaging position.

In this embodiment, the electrode cap engaging means preferably comprises a cylindrical pusher. Chute means are pivotally mounted to the body of the electrode cap mounting means and carries a serial arrangement of new electrode caps. The welding electrode arm forcibly urges the discharge end of the chute means downward into co-axial alignment with one of the first and second pushers as the electrode arm is moved into the cap mounting apparatus. Activation of linear drive means pivots the pusher to the second position to forcibly urge a new welding electrode from the discharge end of the chute means onto the end if the welding electrode arm located adjacent to the discharge end of the chute means.

A second identical chute means may be provided adjacent to the second electrode cap engaging member for mounting a new electrode cap on the opposed welding electrode of a typical welding electrode assembly.

The apparatus of the present invention overcomes many of the problems encountered in the use of resistance spot welding equipment. The present apparatus automatically removes worn electrode caps from welding electrodes and mounts new caps on such electrodes. This is done in a short period of time thereby minimizing the possibility of production stoppages or down time. Further, the apparatus is automatic thereby eliminating any manual labor.

DESCRIPTION OF THE DRAWING

The various features, advantages and uses of the present invention will become more apparent by referring to the following detailed description of the drawing in which.

DESCRIPTION OF THE PREFERRED EMBODIMENTS

Figure 1:
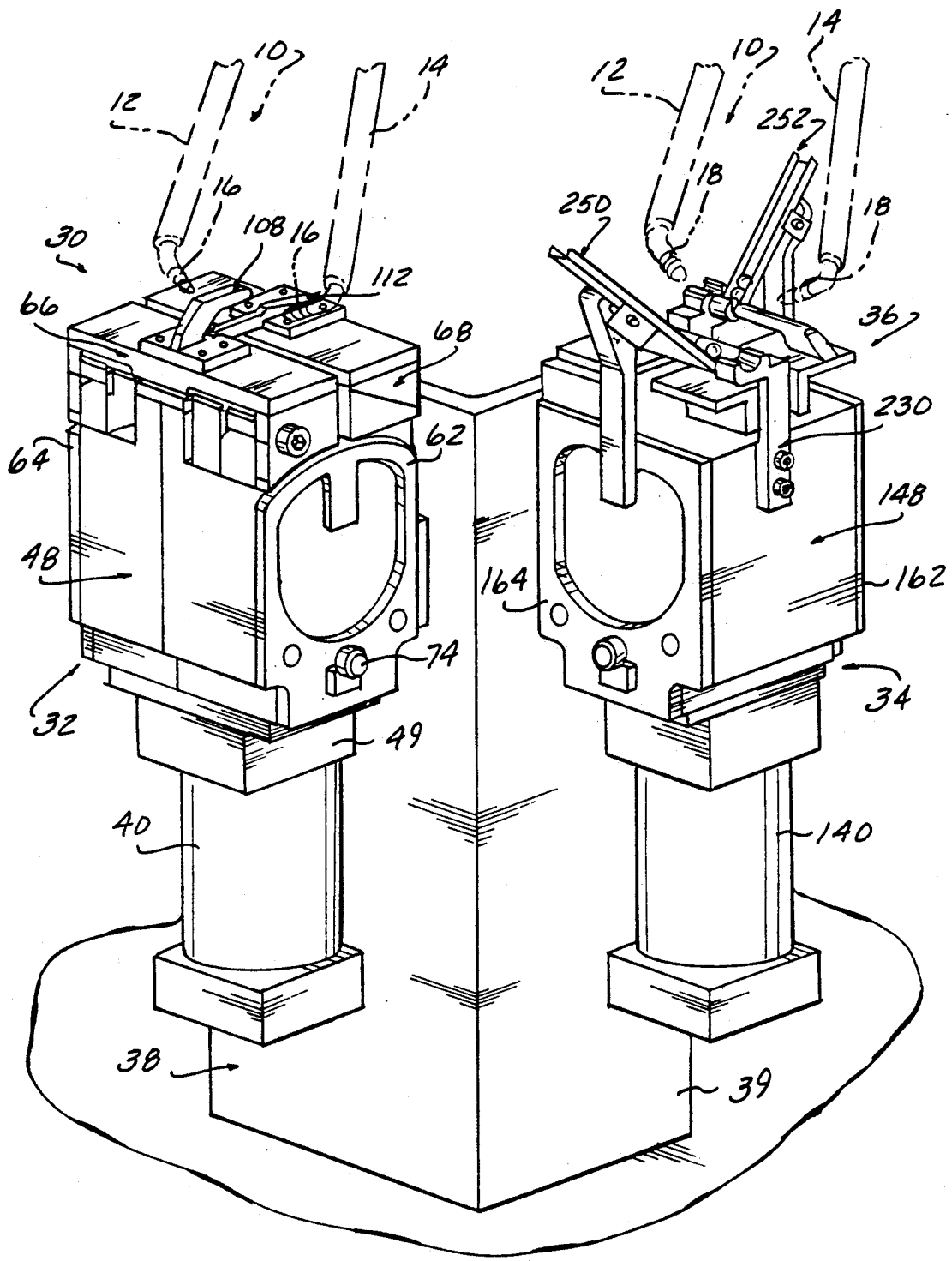
FIG. 1 is a perspective view of a resistance spot welding electrode cap changer constructed in accordance with the teachings of the present invention.

As shown in the drawing, the present invention is a resistance spot welding electrode cap changer which automatically removes a worn electrode cap from a resistance spot welding electrode assembly and mounts a new electrode cap on the electrode assembly.

Before describing the details of the present invention, a brief description of the environment in which the present invention employed will be presented.

As shown in FIG. 1, a typical resistance spot welding electrode assembly 10 includes a pair of electrode arms 12 and 14, one or both of which are pivotally mounted so as to exhibit pivotal movement with respect to the opposed electrode arm. Either or both of the electrode arms 12 and 14 may be pivoted by means of a conventional fluid operated cylinder, not shown. The cylinder controls the position of the electrode arms 12 and 14 and moves the arms 12 and 14 from a first, spaced apart, non-engaging position shown in phantom in FIG. 1 to a closed position in which the electrode caps 16 mounted on the ends of the arms 12 and 14 contact a metal stack disposed therebetween.

Figure 6:
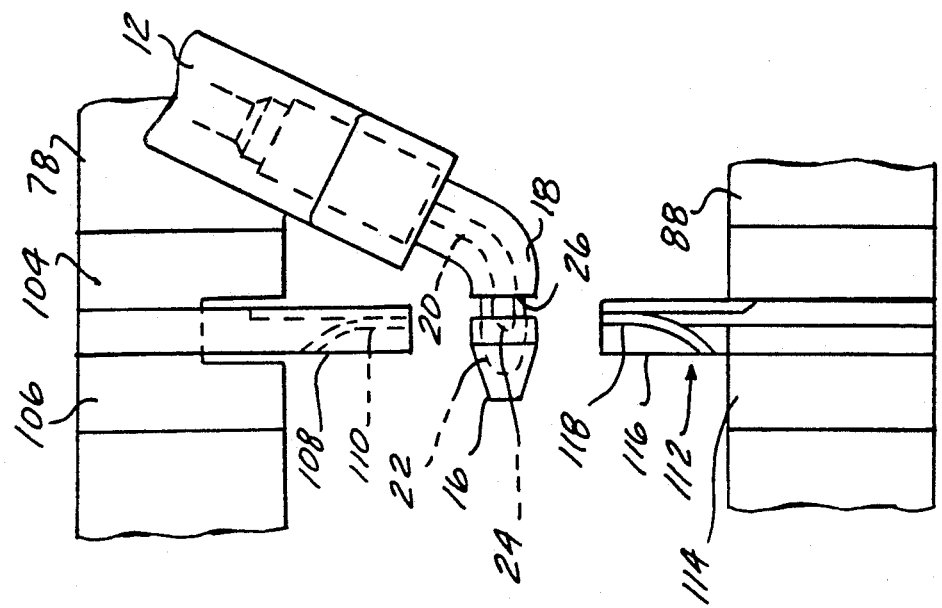
FIG. 6 is a partial, end view of the electrode cap removal apparatus shown in FIG. 4.

As shown in greater detail in FIG. 6, each electrode arm, such as electrode arm 12, has an electrode shank 18 fixably mounted at an outer end. The shank 18 may be straight or curved, as shown in FIG. 6. The electrode shank 18 is hollow such that a coolant fluid supply tube 20 which extends through the length of the electrode arm 12 may pass therethrough to provide coolant fluid to the electrode cap 16. The electrode shank 18 terminates in a tapered end portion 22.

The electrode cap 18 in the configuration to which the present invention pertains, is press fit or forcibly mounted on the tapered end portion 22 of the electrode shank 18. In this mounting arrangement, the inner end 24 of the electrode cap 16 contacts in registry the shoulder 26 formed at the end of the shank 18 at the start of the tapered portion 22.

Welding guns employing the above-described electrode assembly are typically movably mounted so as to be manually positioned and operated by a worker, fixably mounted in a machine tool and activated by automatic control equipment, or mounted on the end of a robot, multi-axis manipulator which moves the welding gun through its preprogrammed path of movement during which the weld gun performs numerous spot welds. The present electrode cap changer apparatus can be employed in all of the above-described resistance spot welding applications. However, in a preferred embodiment, the automatic electrode cap changer apparatus of the present invention is employed with a robot welding apparatus which has a welding assembly, such as the welding assembly 10 described above mounted on an end effector at the end of the manipulator arm. The robot moves the welding gun through its preprogrammed path, which program is stored in the memory of the robot, and sequentially activates the welding gun to perform resistance spot welds at preprogrammed locations. When it is necessary to replace the worn electrode cap 16 with new caps so as to maintain the desired end diameter or contact surface of the electrode caps, the robot executing its program will move the welding gun from the production line to the electrode cap changer denoted in general by reference number 30 in FIG. 1, which is immediately adjacent the production line.

The electrode cap changer 30 includes an electrode cap removing apparatus 32 and a new electrode cap mounting or installing apparatus 34.

In the robotic welding gun application described above, the electrode cap removing and mounting apparatuses 32 and 34 are fixedly mounted on a suitable mounting plate or base 36. The shape and size of the base 36 is shown by way of example only as it may be designed to suit any particular production line setup. As shown in FIG. 1, the base 36 comprises an angle plate having a first leg 38 and a second, generally perpendicular leg 39. The base 36 is mounted on a floor or other suitable support surface.

The electrode cap removal apparatus 32 shown in FIG. 1 is depicted in greater detail in FIGS. 2-6.

The electrode cap changer apparatus 32 includes a linear drive means 40 which has an extensible and retractable, reciprocal linear drive member 42 mounted therein. In a preferred embodiment, the linear drive means 40 comprises a fluid operated cylinder, such as a hydraulic or pneumatic cylinder. The linear drive member 42 is a cylinder rod extending outward from one end of the cylinder, with the other end of the cylinder rod 42 being connected to the piston within the cylinder. The cylinder rod 42 reciprocates between extended and retracted positions with respect to the cylinder 40 upon bi-directional activation of the piston within the cylinder 40.

Figure 3:
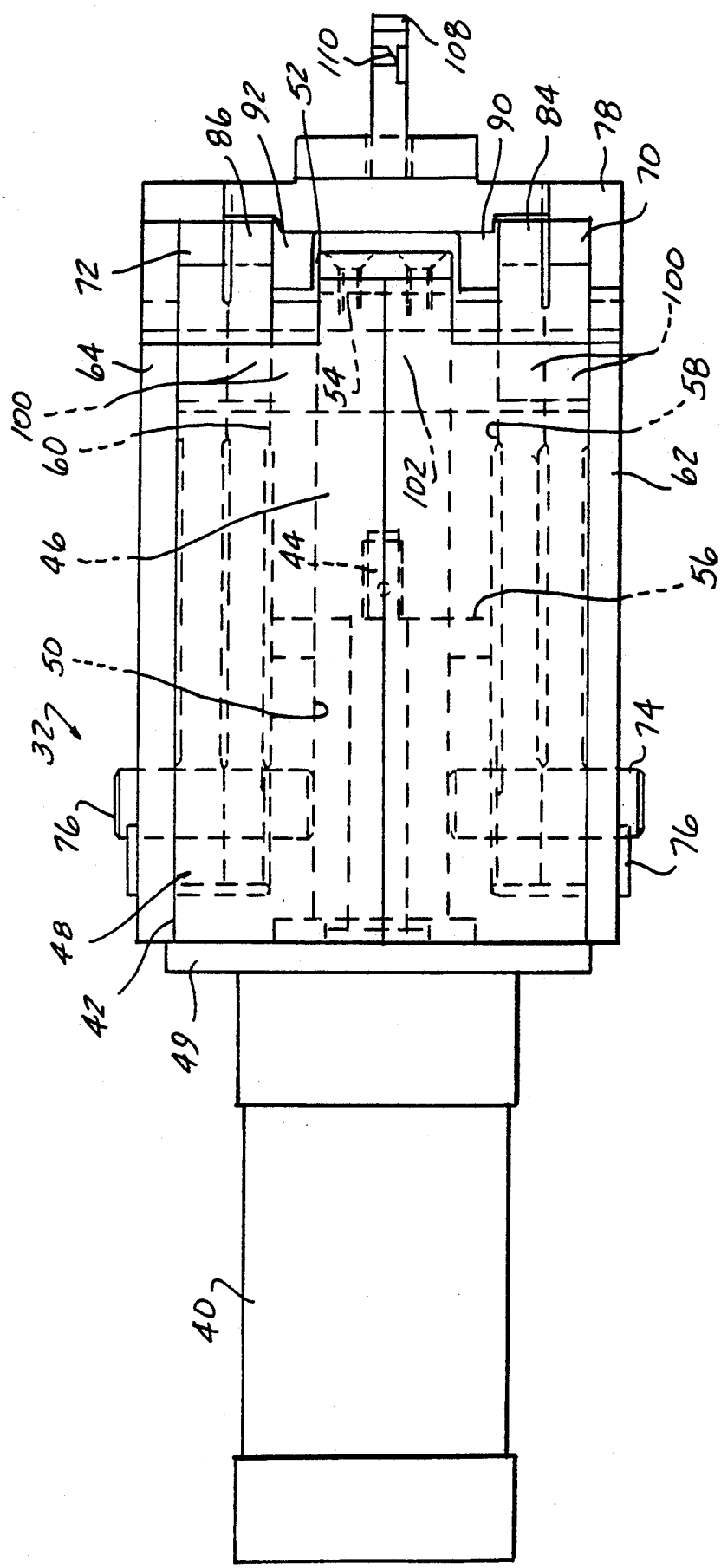
FIG. 3 is a plan view of the electrode cap removal apparatus shown in FIG. 2.

As shown in FIG. 3, the outer end 44 of the cylinder rod 42 has a reduced diameter and is provided with a plurality of external threads. The outer end 44 threadably engages a slider 46. The slider 46 may also be fixedly attached to the cylinder rod 42 by other means, such as by a press fit, welding, etc.

The apparatus 32 further includes a support body denoted by reference number 48. The support body 48 may be formed of a single, solid member or two, identical halves fixedly joined together. The support body 48 is fixedly mounted to the drive means or cylinder 40 by means of suitable fasteners extending through an end plate 49 affixed to one end of the cylinder 40, as shown in FIGS. 2-5. The support body 50 also includes a longitudinally extending, central bore 50 which extends through the end cap 49 and completely through the support body 50. The opposite end of the bore 50 is closed by a closing plate 52, shown in FIG. 3 which is attached to the support body 48 by means of suitable fasteners 54. Opposed lateral slots 56 are formed on opposite sides of the support body 48 and open into the central bore 50. Finally, the opposed sides 58 and 60 of the support body 48 are formed with identical, recessed surfaces having a generally curvilinear shape, the purpose of which will be described in greater detail hereafter.

Figure 2:
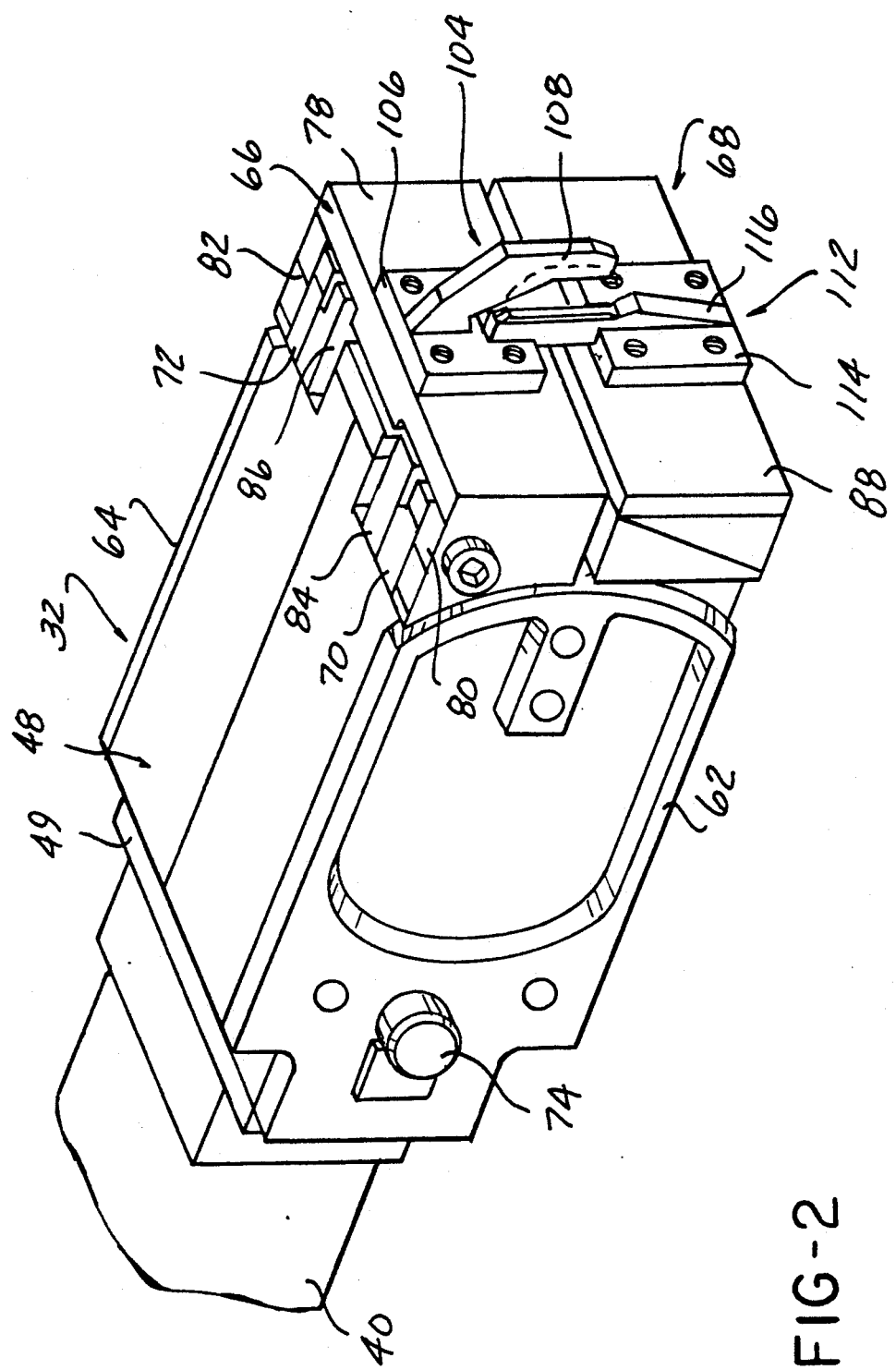
FIG. 2 is a perspective view of the electrode cap removal apparatus shown in FIG. 1.

The apparatus 32 further includes two side plates 62 and 64 which are fixedly secured to opposite sides of the support body 48 by means of a plurality of fasteners, as shown in FIG. 2.

The electrode cap removal apparatus 32 also includes first and second electrode cap engaging means denoted in general by reference numbers 66 and 68. The first and second electrode cap engaging means 66 and 68 are responsive to reciprocation of the linear drive means 40 and exhibit pivotal action to move from an open, space apart position shown in FIG. 4 to a closed position shown in FIGS. 2 and 5 in which the opposed surfaces of the first and second electrode cap engaging means 66 and 68 engage and separate an electrode cap from an electrode shank.

Figure 4:
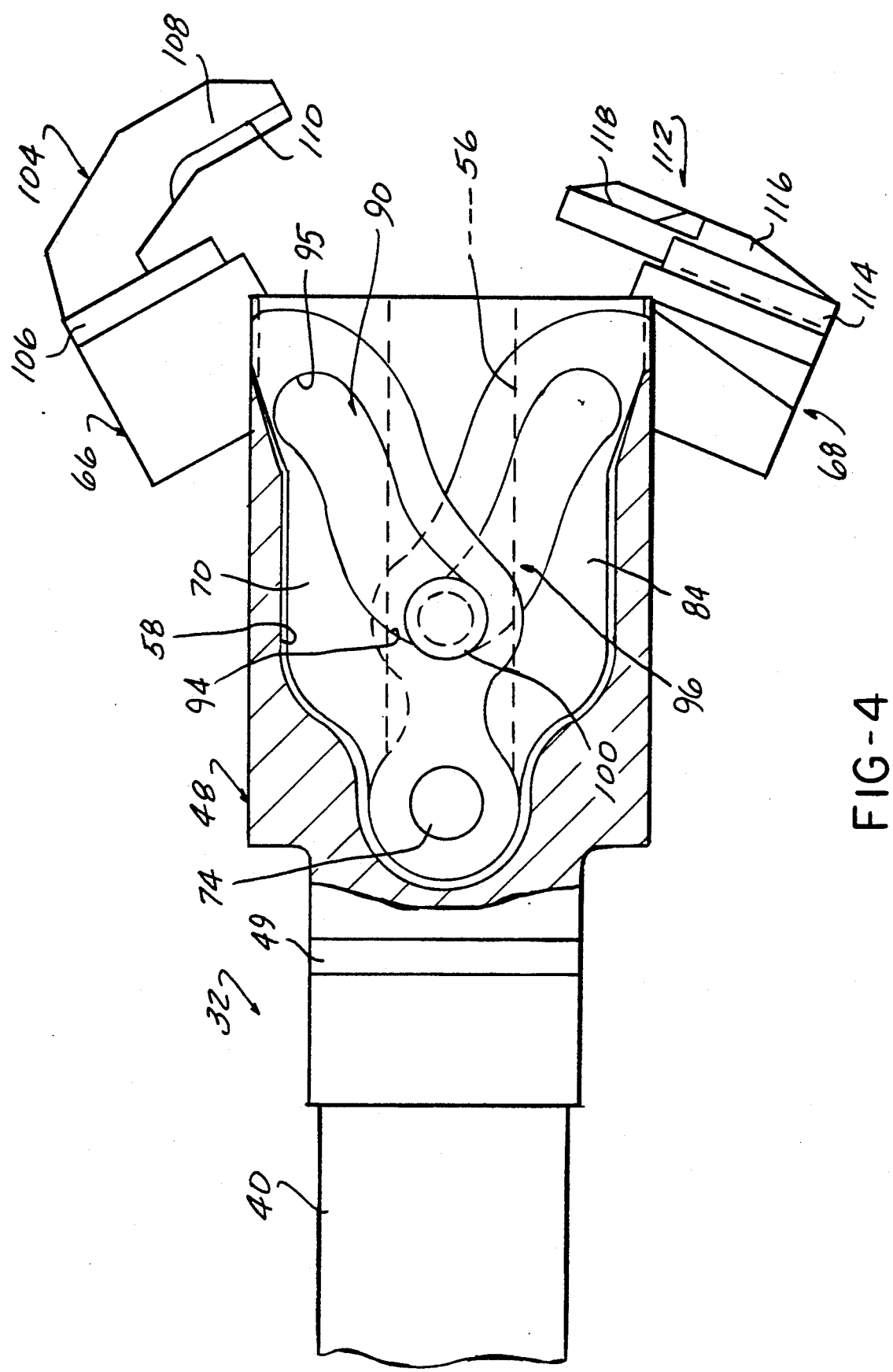
FIG. 4 is a partially broken away, side elevational view of the electrode cap removal apparatus, with the elements thereof shown in their spaced apart, non-electrode cap engaging position.
Figure 5:
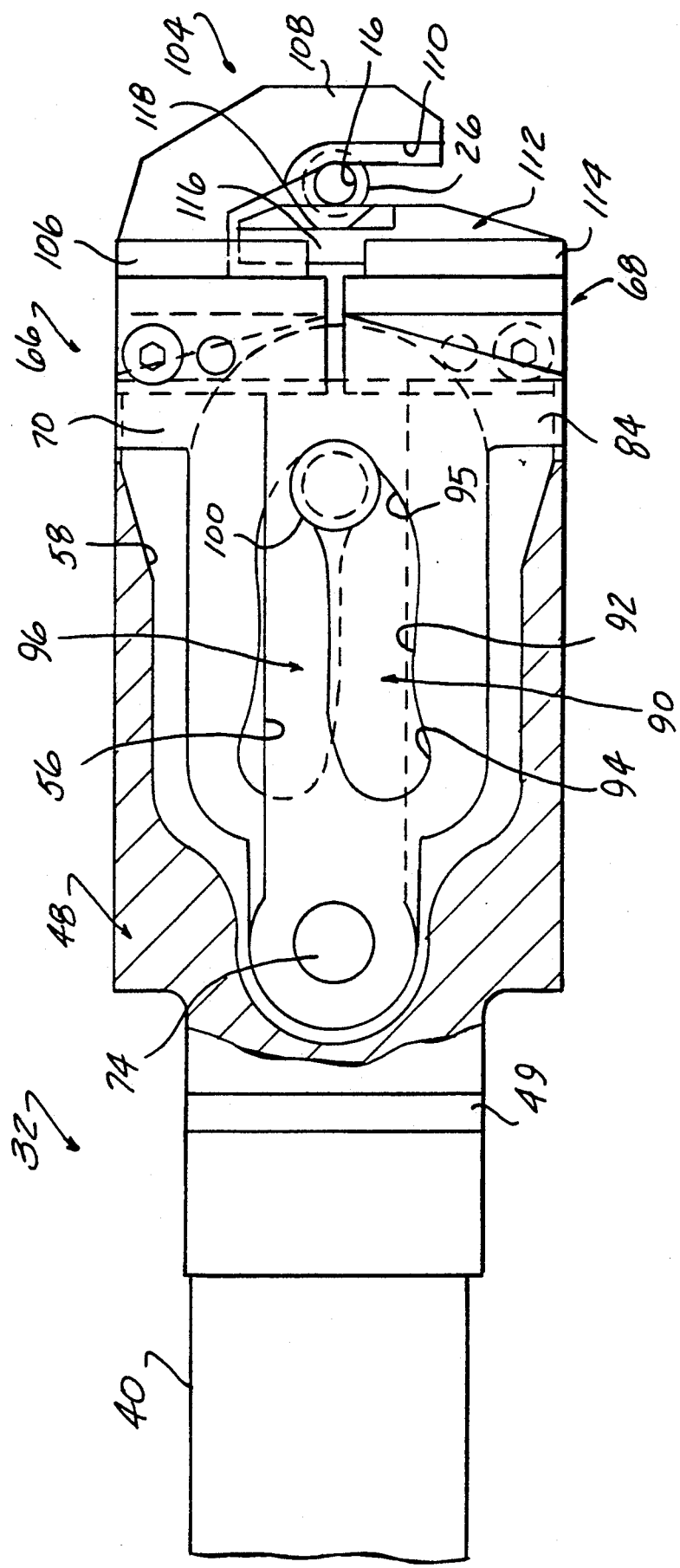
FIG. 5 is a partially broken away, side elevational view similar to FIG. 4; but showing the elements thereof in the electrode cap engaging position.

The first electrode cap engaging means 66 includes first and second arms 70 and 72, respectively. The first and second arms 70 and 72 are pivotally mounted can opposite sides of the support body 48 in the recessed or cut out portions 58 on the side walls of the support body 48 as shown in FIGS. 4 and 5. One end of each of the first and second arms 70 and 72 is pivotally connected to the support body 48 by means of pivot pins 74 and 76, respectively, which extend through the adjacent side plates 62 and 64, the first arm 70 into a solid portion of the support body 48. A keeper 76 is mounted on each of the side plates 62 and 64 and engages a flat formed in an outer end of each of the pivot pins 74 and 76 to retain the pivot pins 74 and 76 in a fixed position.

The other ends of the first and second arms 70 and 72 are fixedly connected to an upper cross member 78 as shown in detail in FIGS. 2 and 3. The upper cross member 78 includes opposed, outer legs 80 and 82 which extend perpendicular therefrom and are secured to the second ends of the first and second legs 70 and 72, respectively, by means of fasteners or other connecting means.

Similarly, the second electrode cap engaging means 68 includes first and second, spaced arms 84 and 86, as shown in FIGS. 3, 4 and 5. A first end of each of the first and second arms 84 and 86 is pivotally connected to the support body 48 by the pivot pins 74 and 76. The second or opposed ends of the first and second arms 84 and 86 of the second electrode cap engaging means 68 are connected to a lower cross member 88. The lower cross member 88 has a pair of spaced outwardly extending legs 90 and 92, as shown in FIG. 3 which extend perpendicularly therefrom and are connected to the second ends of the legs 84 and 86 by suitable fasteners, not shown.

As shown in FIGS. 4 and 5, cam means denoted in general by reference number 90 are formed in each of the first and second arms 70 and 72 of the first electrode cap engaging means 66. The cam means 90 may have any desired shape to effect pivotal movement of the arms 70 and 72 as described hereafter. In a preferred embodiment, each of the cam means 90 includes a centrally located, generally linear portion 92 and first and second end portions 94 and 95, respectively, which are angularly disposed with respect to the central linear portion 92 and inverted from each other.

Cam means 96 identical to the cam means 90 described above are formed in each of the first and second legs 84 and 86 of the second electrode cap engaging means 68. Each of the cam means 96 is also preferably formed with a generally linear central portion and opposed, angularly oriented first and second end portions.

Each of the arms 70, 72, 84 and 86 are formed of a suitable, high strength material, such as a high strength steel. Further, the cam means 90 and 96 formed in each of the arms 70, 72, 84 and 86 is hardened for durability.

Although the cam means 90 and 96 are identically formed, as shown in FIGS. 4 and 5, the cam means 96 are inverted in orientation from the cam means 90. This creates an opposed movement of the first and second electrode cap engaging means 66 and 68 in a scissor-like action.

Cam follower means 100 are disposed in each of the cams 90 and 96 in the arms 70, 72, 84 and 86 and ride along the cam means 90 and 96 as the linear drive means 40 reciprocates. Preferably, the cam follower means 100 comprises a roller or busing which are rollable mounted on opposed outer ends of a cross pin 102 which is fixedly mounted in the slider 46 and extends outward from opposed sides of the slider 46, as shown in FIGS. 3, 4 and 5, through the slots 56 in the body 48. In this manner, as the linear drive means 40 reciprocates, the slider 46 will likewise reciprocate within the bore 50 in the support body 48. The cam followers 100 will also linearly reciprocate and, as the cam followers 100 engage the respective cams 90 and 96, the pairs of arms 70, 72 and 84, 86 will pivot from a first spaced apart position shown in FIG. 4 to a second, closed, electrode cap engaging position shown in FIG. 5.

A first or upper jaw 104 includes a base 106 which is affixed, such as by threaded fasteners, to the upper cross member 78 as shown in FIGS. 2-5. The upper jaw 104 also includes an outwardly extending, curvilinear finger 108. As shown in greater detail in FIG. 6, the finger 108 includes a knife edge 110 which extends from a pointed terminal end angularly along a generally curvilinear path. This knife edge 110 forcibly engages the joint between the inner end 24 of an electrode cap 16 and the outer end 26 of an electrode shank 16 and exerts a rolling action to the electrode cap 16 as the upper jaw 104 pivots inwardly toward an opposed lower jaw 112.

As shown in FIG. 2, the lower jaw 112 includes a base 114 which is threadingly connected to the lower cross piece 88. A finger 116 extends outward from the base 114 and includes a knife edge 118. The knife edge 118 on the lower jaw 112 is directly opposed from the knife edge 110 on the upper jaw 104 so as to exert an identical, but opposite rolling action on the joint between the electrode cap 16 and the shank 18 which forcibly separates the electrode cap 16 from the end taper 22 on the shank 18.

In general operation, the electrode cap removal apparatus 32 will be positioned with the linear drive means or cylinder 40 retracted such that the first and second electrode cap engaging means 66 and 68 have pivoted outward to their spaced apart positions shown in FIG. 4. The robot welder then positions one arm, such as electrode arm 12, in position between the first and second jaws 104 and 106. The linear drive means 40 is then activated which causes the cylinder rod 42 to linearly extend outward therefrom. The cam followers 100 mounted on the cross pin 102 traverse along the cams 90 and 92 and pivot the pairs of arms 70 and 72, and 84 and 86 to the closed position shown in FIG. 5. As the jaws 104 and 106 approach the closed position shown in FIG. 5, the respective knife edges 110 and 118 will engage the joint between the electrode cap 16 and the shank 18 and exert a forcible rolling action thereto which separates the electrode cap 16 from the shank 18.

After the arms 70, 72 and 86 are pivoted apart, the robot welder rotates the welding electrode assembly 180° to place the electrode arm 14 adjacent the electrode cap removal apparatus 32. The drive means 40 is again activated and the above process repeated to remove the cap 16 from the arm 14.

It will be understood that the above-described sequence of operations could be modified to remove only one electrode cap from an electrode assembly if only one cap needs to be replaced.

After all of the electrode caps 16 which need to be replaced have been removed from the welding electrode assembly 10, the robot moves the electrode assembly 10 to the electrode cap mounting or installing apparatus 34.

Figure 7:
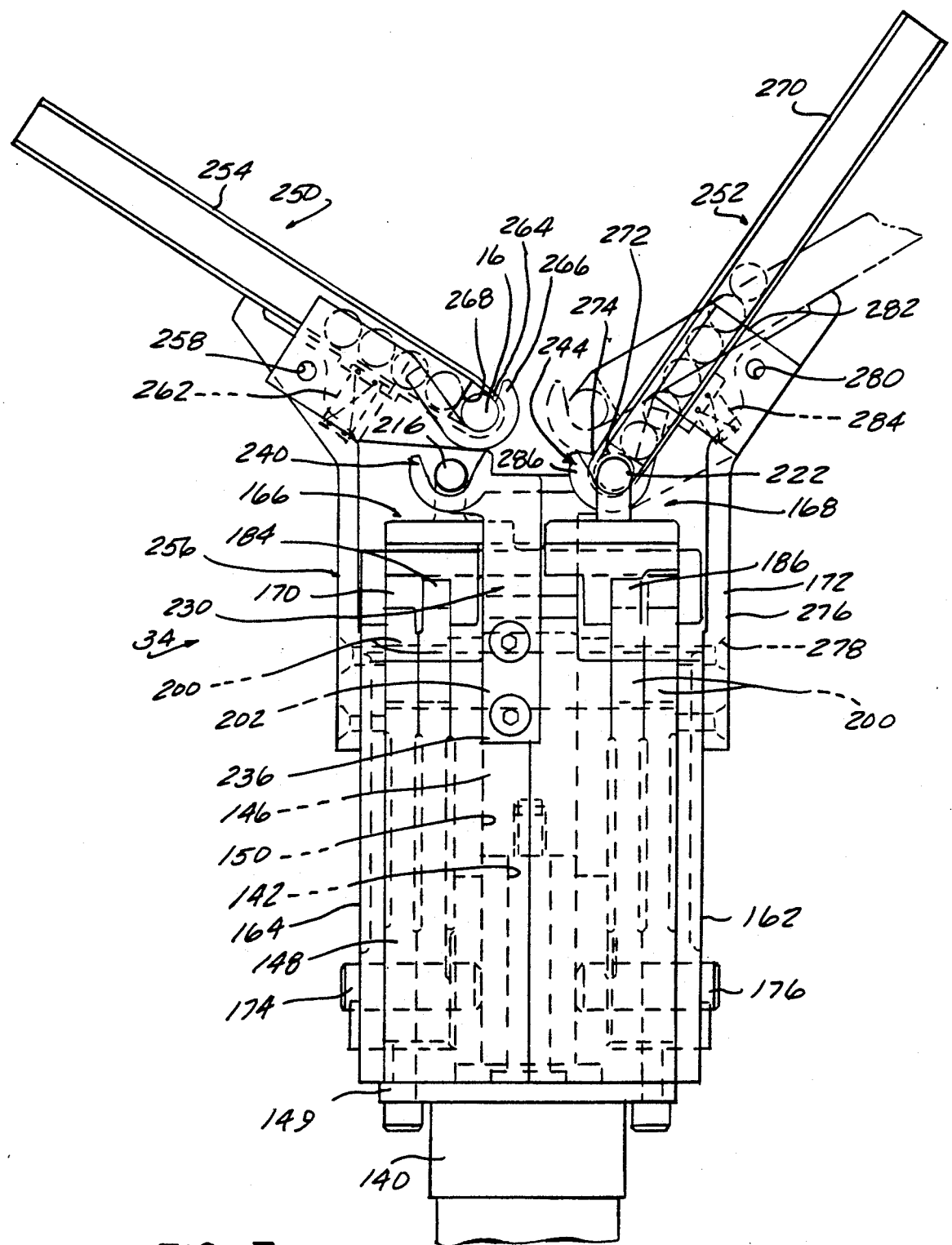
FIG. 7 is a front elevational view of the electrode cap mounting apparatus shown in FIG. 1.
Figure 8:
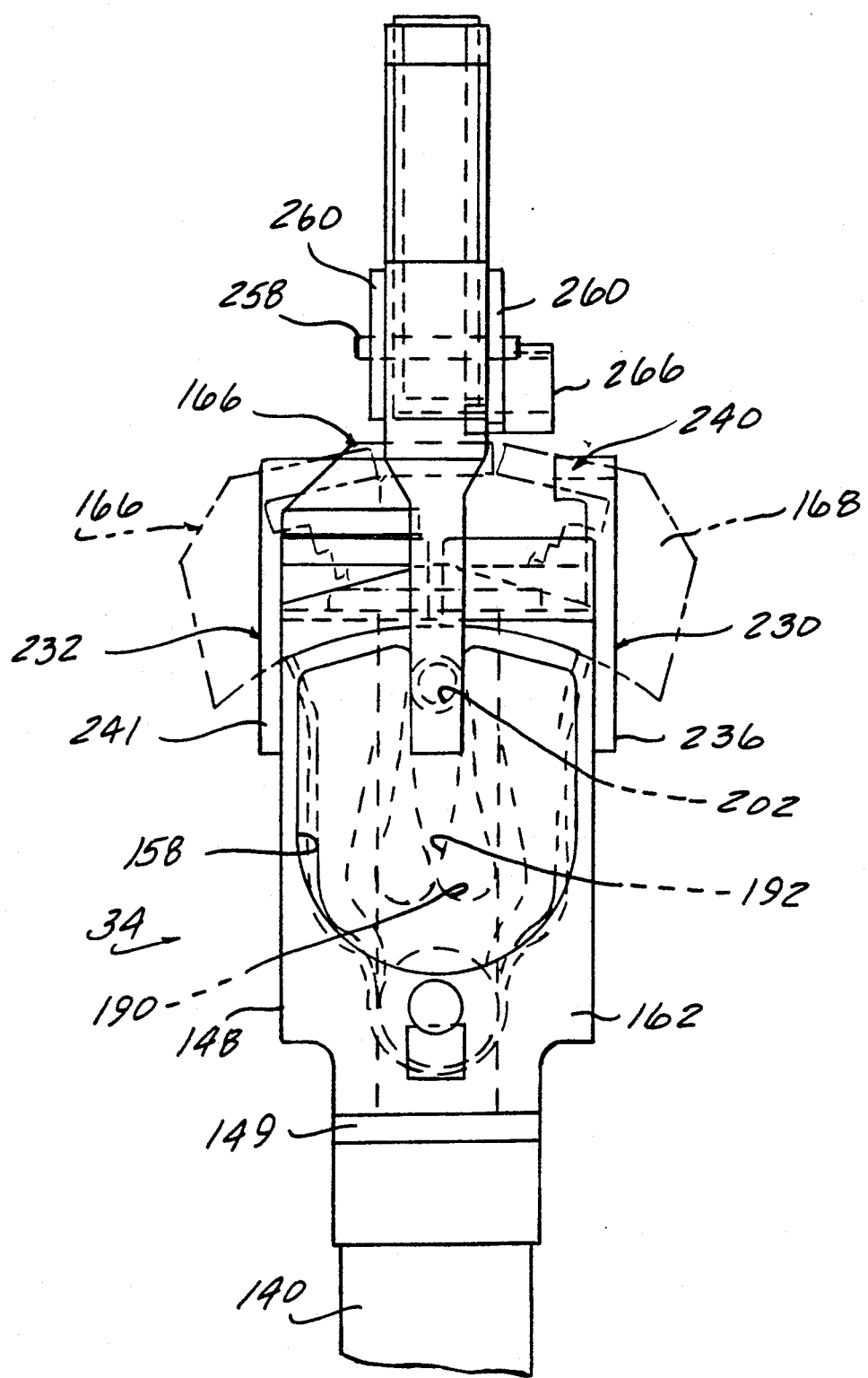
FIG. 8 is a side elevational view of the electrode cap mounting apparatus shown in FIG. 7.

The electrode cap mounting or installation apparatus 34 includes a number of elements which are identical to corresponding elements in the electrode cap removal station 32 described above. The apparatus 34 includes a linear drive means 140, preferably in the form of a reciprocal fluid operated cylinder. A cylinder rod 142 extends outward from the cylinder 140 and is fixedly connected to a slider 146. The slider 146 reciprocates within a bore 150 formed in a support body 148 which is attached to one end of the cylinder 140. The opposed side walls of the support body 148 have curvilinear recesses 158, as shown in FIGS. 7 and 8, formed therein. The opposed side walls of the support body 148 are closed by side plates 162 and 164 which are attached thereto by suitable fasteners.

First and second electrode cap engaging means 166 and 168, respectively, are pivotally mounted in the side recesses on the support body 148. The first electrode cap engaging means 166 includes first and second spaced arms 170 and 172, respectively. Each of the arms 170 and 172 is pivotally connected to the support body 148 by means of pivot pins 174 and 176, respectively which extend through the side plates 162 and 164 into the support body 148.

The second pair of arms 184 and 186 on the second electrode cap engaging means 168 are likewise pivotally connected to the support body 148 by the pivot pins 174 and 176, respectively. The second pair of arms 184 and 186 are located adjacent to, but laterally inward from the first pair of arms 170 and 172.

The opposed ends of the first arms 170 and 172 are fixedly connected to a first cross member 178. The first cross member 178 includes opposed end flanges 180 and 182 which are connected by suitable fasteners to respective ones of the second ends of the legs 170 and 172.

Similarly, the second ends of the legs 184 and 186 are fixedly connected to a second cross member 188. The second cross member includes a pair of outwardly extending legs 190 and 192 which are connected by fasteners or other connecting means to the second ends of the legs 184 and 186.

As shown in FIG. 8, identical cam means 190 are formed in each of the first pair of arms 170 and 172. Identical cam means 192 are also formed in the second arms 184 and 186. However, the second cam means 192 are inverted in orientation from the first cam means 190 in the same manner as described above in the electrode cap removal apparatus 32.

A cross pin 202 is fixedly mounted in and extends outward from the slider 146. Cam followers 200, in the form of rollers or bushings, are mounted on the outer ends of the cross pin 202 and rollably engage one of the cam means 190 and 192 in the arms 170, 172, 184 and 186 to convert reciprocal movement of the linear drive means 140 to pivotal movement of the first and second electrode engaging means 166 and 168 from a first, open, spaced position shown in phantom in FIG. 8 to a second, closed position, shown in solid, in which one of the first and second electrode cap engaging means 166 and 168 engages an electrode cap 16, as described hereafter.

Figure 9:
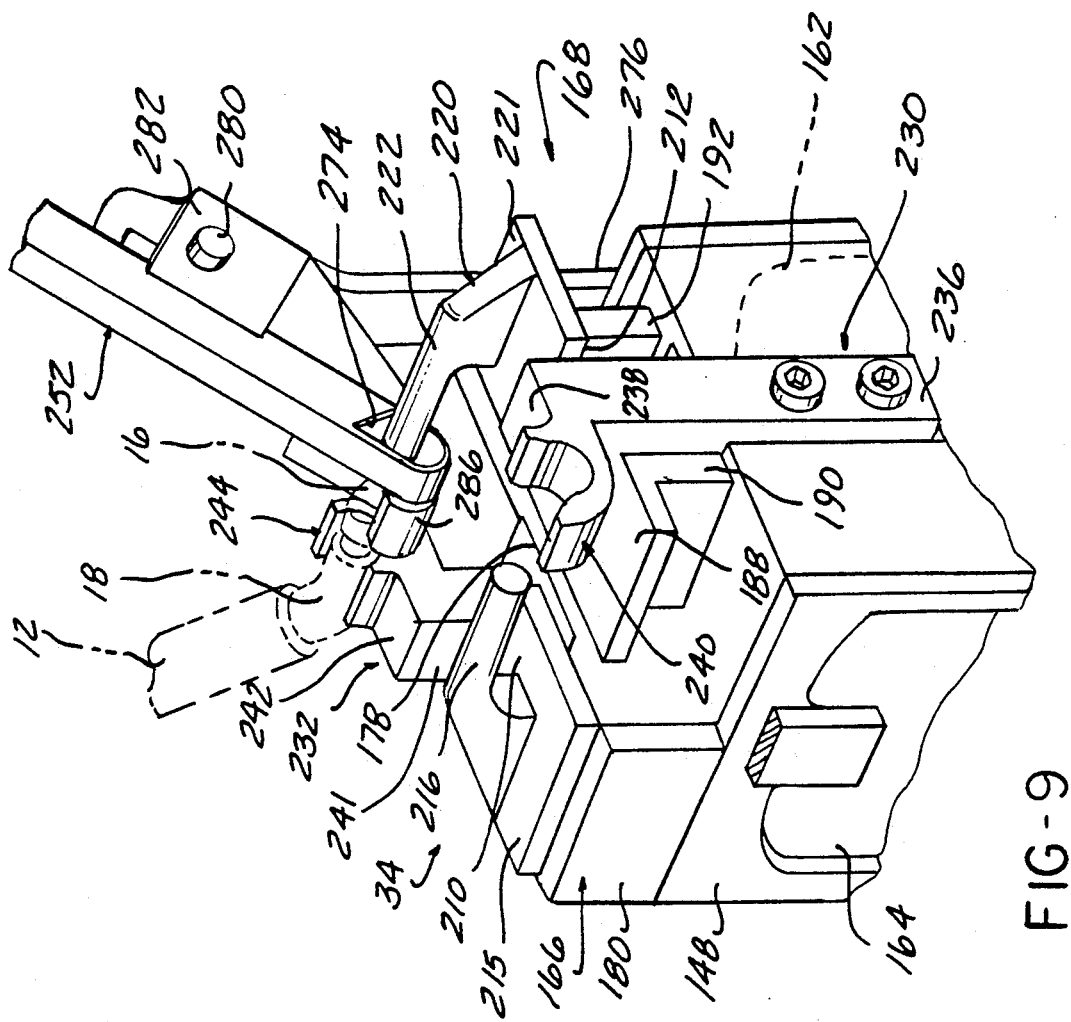
FIG. 9 is a partial, perspective view of the electrode cap mounting apparatus.

As shown in FIG. 9, the first cross member 178 includes a centrally located notch 210 which opens outward from the cross member 178. The second cross member 188 includes an identical, opposed notch 212 which opens in an opposite direction from the second cross member 188.

A first electrode cap engaging member 214 includes a pusher 216 in the form of a generally cylindrical rod is fixedly mounted to a base 214 through an enlarged base support. The base is mounted by means of threaded fasteners to the first cross member 174 between the end flange 180 and the central notch 210. The pusher 216 functions to forcibly urge a new electrode cap 16 onto a capless shank 18 as the first electrode cap engaging means 166 are pivoted to the closed position shown in solid in FIG. 8.

An identical, second electrode cap engaging member 220 includes a base 221 which is fixedly mounted by threaded fasteners to the second cross member 188 between one end of the second cross member 188 and the central notch 212, as shown in FIG. 9. A generally cylindrical pusher rod 222 is mounted on and extends from the base 221 toward the first cross member 178. The second pusher 222 functions in the same manner as the first pusher 216 to forcibly urge an electrode cap 16 shown in phantom in FIG. 9 onto the shank 12 of the other electrode arm 14.

The new elements of the electrode cap mounting apparatus 34 which are not found in the electrode cap removal apparatus 32 comprise opposed electrode gun rests 230 and 232. The first gun rest 230 includes a leg member 236 which is fixedly mounted on the support body 148 by means of fasteners. A cross member 238 extends perpendicular from the leg 236 and terminates in an open ended, U-shaped support 240. The support 240 is co-axially aligned with first pusher 216 and functions to support the shank 18 of a capless electrode arm 12 prior to a new electrode cap being forcibly urged thereon.

The second gu rest 232 is identically constructed as the first gun rest 230 and includes a leg 241 which is fixedly mounted to an opposite side of the support body 148. An upper cross member 242 extends perpendicularly from the leg 241 and terminates in an open ended, generally U-shaped support 244. The support 244 supports the shank 18 of an electrode arm 14 prior to a new electrode cap 16 being mounted thereon.

Chute means 250 and 252 are respectively associated with the first and second pushers 216 and 222. The first chute means 250 comprises an elongated, hollow member, having a generally square cross section. The member 254 is adapted to contain a plurality of serially arranged new electrode caps 16. The chute means 250 is pivotally mounted to the support body 148 by means of a pivot bracket 256 which is connected at one end by suitable fasteners to the support body 148. A pivot pin 258 extends through the pivot bracket 256 and engages opposed attaching plates 260 affixed to opposite sides of the chute member 254 and depending downward therefrom. A biasing spring 262 is disposed between the pivot bracket 25 and the bottom surface of the chute member 254 to normally bias the lowermost or discharge end 264 of the first chute means 250 to a downward position as shown in FIG. 7. The biasing means 262 is in the form of a coil spring which seats at one end in a recess in the pivot bracket 256 and in the other in an aperture in a rectangular plate affixed to the chute member 254.

A generally J-shaped receiver 266 is attached to one of the attachment plates 260 and extends laterally outward therefrom. The open portion of the receiver 266 is co-axially aligned with aligned apertures 268 in both side walls of the discharge end 264 of the first chute 250.

The second chute means 252 also comprises an identical hollow conduit 270 which has aligned apertures 272 at a discharge end 274. The second chute means 252 is pivotally mounted via a pivot bracket 256 which is attached to the support body 148 by means of fasteners 278. A pivot pin 280 extends through an opposite end of the pivot bracket 276 and engages opposed attachment plates 282 affixed to and extending downward from opposite sides of the chute member 270. A biasing means in the form of a coil spring 284 is disposed between the pivot bracket 276 and the bottom of the chute member 270 to normally bias the second chute means 252 to the position shown in phantom in FIG. 7.

An open-ended, generally J-shaped receiver 286 is attached to one of the attachment plates 282 and is co-axially aligned with one of the apertures 272 in the discharge end of the second chute means 250.

In use, the biasing springs 262 and 284 will bias the discharge ends 264 and 274 of the chutes 250 and 252 upward as shown in solid for chute 250 and in phantom for chute 252 in FIG. 7. The robot welder will move the welding electrode assembly into position with respect to the electrode cap mounting apparatus 34 and place the shank 18 of a capless arm 12 onto the receiver 264 of the first chute 250. This urges the discharge end 264 of the chute 250 downward into a load position until the shank 18 contacts the gun rest 230. The electrode cap mounting apparatus 34 is then activated causing the linear drive means 140 to extend. This causes the first and second workpiece engaging means 166 and 168 to pivot inward toward each other to the position shown in solid in FIG. 8. During such pivotal movement, the pusher 216 engages a new electrode cap 16 in the discharge end 264 of the chute 250 and pushes the electrode cap 16 from the chute 250 across the receiver 264 and onto the shank 18 of the electrode arm 14 which is resting on the gun rest 230. As the first electrode cap engaging means 166 moves under considerable force, i.e., approximately 1200 pounds, the electrode cap 16 is forcibly and securely mounted on the shank 18 of the electrode arm 14.

It should be noted that while the first and second electrode cap engaging means 166 and 168 are pivoting together, the second pusher 222 does not contact an electrode cap 16 in the chute 252 since the discharge end of the chute 254 is biased upward and spaced from the gun rest 266 as shown in phantom in FIG. 7.

However, after a new electrode cap 16 has been mounted on the arm 14, the robot indexes the electrode assembly to the adjacent end of the first and second electrode cap engaging means and lower the electrode arm 12 until the shank 18 contacts an edge of the receiver 286. This forces the discharge end 274 of the chute 252 downward until the discharge apertures 272 in which a new electrode cap are aligned with the gun rest 232 and the second pusher 222. The next time the electrode cap mounting means 34 is activated, the pusher 222 will engage the electrode cap 16 in the discharge end of the chute 252 and force the electrode cap 16 onto the shank 18 of the electrode arm 12.

It should be noted that while the above-identified sequence describes two separate cap mounting stations in the electrode cap mounting apparatus 34, this may be modified to contain only a single cap mounting station, with the robot welder rotating the electrode assembly 180° between each operation so that new caps may be mounted on each of the two arms of the electrode assembly.

In summary, there has been disclosed a unique apparatus for replacing electrode caps or spot welding electrodes. The apparatus provides a simple and fast means for removing worn electrode caps from an electrode assembly and mounting new electrode caps on the electrode assembly. The apparatus is automatic thereby completely eliminating manual labor previously required to replace or redress worn electrode caps. The apparatus also generates a high force to forcibly separate a cap from the electrode where the cap is in direct contact with the electrode shank.

What is claimed is:

1. An apparatus for replacing welding electrode caps mounted on welding electrodes comprising:
    first linear drive means having a first reciprocally extendable and retractable drive member;
    a first body, the body having a through bore through which the first linear drive means reciprocates;
    first and second electrode cap engaging means, the first and second electrode cap engaging means disposed in opposed, inverted positions with respect to each other and pivotally connected at first ends to the first body;
    first and second cam means formed in the first and second electrode cap engaging means, respectively, the first and second cam means being identical and disposed in opposed, inverted relation with respect to each other;
    cam follower means, mounted on the first drive member and engaging the first and second cam means in the first and second electrode cap engaging means, for pivoting the first and second electrode cap engaging means between a first, spaced apart, open position and a second, closed position as the first drive member reciprocates; and
    opposed knife edges formed on the first and second electrode cap engaging means, respectively, for engaging opposite sides of the joint between the electrode cap and the welding electrode to forcibly separate the electrode cap from the welding electrode as the first and second electrode cap engaging means pivot to the second position.

2. The apparatus of claim 1 wherein:
    each of the first and second workpiece engaging means includes first and second spaced arms, each of the first and second spaced arms having a first end;
    the first ends of each of the first and second spaced arms being pivotally connected to the first body; and
    the first and second cam means including first and second identical, spaced cams formed in each of the first and second arms of each of the first and second electrode cap engaging means.

3. The apparatus of claim 2 wherein each of the cam means comprises:
    a cam track having a central linear portion; and
    first and second end portions angularly disposed with respect to the central linear portion and inverted from each other.

4. The apparatus of claim 1 wherein the cam follower means comprises:
    a first pin mounted on the first linear drive member, the first pin having first and second ends extending outward from opposite sides of the first linear drive member; and
    first cam follower means comprising first cam follower members mounted on each of the first and second ends of the first pin for engaging the first and second cam means formed in the first and second electrode cap engaging means.

5. The apparatus of claim 1 wherein the first linear drive means comprises:
    a fluid operated cylinder; and
    the first linear drive member comprises a cylinder rod extensibly and retractably mounted in the cylinder and extending outward from the cylinder.

6. The apparatus of claim 1 further comprising electrode cap mounting apparatus, the electrode cap mounting apparatus comprising:
    second linear drive means having a reciprocally extendible and retractable second drive member;
    third and fourth electrode cap engaging means, each having first and second ends, the third and fourth electrode cap engaging means disposed in opposed, inverted positions with respect to each other and pivotally connected at the first ends to the second linear drive means;
    a second body, the body having a through bore through which the second linear drive means reciprocally extends;
    first and second cam means formed in the third and fourth electrode cap engaging means, respectively, the first and second cam means in the third and fourth electrode cap engaging means being disposed in opposed, inverted relationship with respect to each other;
    second cam follower means, mounted on the second drive member and engaging the first and second cam means, for pivoting the third and fourth electrode cap engaging means between a first, spaced apart, open position and a second position wherein the third and fourth electrode cap engaging means is adapted to engaging and forcibly mount an electrode cap on a welding electrode; and
    pusher means mounted on each of the third and fourth electrode cap engaging means, for pushing a new electrode cap engaging means onto the welding electrode as the third and fourth electrode cap engaging means pivot to the second position.

7. The apparatus of claim 6 wherein:
    each of the third and fourth electrode cap engaging means includes first and second spaced arms, each of the first and second spaced arms having a first end;

the first ends of each of the first and second spaced arms being pivotally connected to the second body; and the first and second cam means comprising:
first and second identical, spaced cams formed in each of the first and second arms of each of the third and fourth electrode cap engaging means.

8. The apparatus of claim 7 wherein each of the first and second cam means comprises:
a cam track having a central linear portion; and
first and second end portions angularly disposed with respect to the central linear portion and inverted from each other.

9. The apparatus of claim 6 wherein the second cam follower means comprises:
a second pin mounted on the second linear drive member, the second pin having first and second ends extending outward from opposite sides of the second linear drive member; and
second cam follower means comprising cam follower members mounted on each of the first and second ends of the second pin for engaging the first and second cam means formed in the third and fourth electrode cap engaging means.

10. The apparatus of claim 6 wherein the second linear drive means comprises:
a second fluid operated cylinder; and
the second linear drive member comprises a cylinder rod extensibly and retractably mounted in the second cylinder and extending outward from the second cylinder.

11. The apparatus of claim 6 further comprising:
chute means for storing a plurality of serially arranged electrode caps, the chute means having a cap discharge end with opposed, open side walls; and
the discharge end being selectively alignable with one of the third and fourth electrode cap engaging means in the electrode cap mounting apparatus for mounting an electrode cap positioned in the discharge end of the chute means onto a welding electrode.

12. The apparatus of claim 11 wherein the chute means comprises:
a hollow, elongated member with closed top, bottom and opposed side walls; and
means for pivotally mounting the elongated member to the body such that the discharge end of the elongated member is movable between a first position spaced from one of the third and fourth electrode cap engaging means and a second position aligned with one of the third and fourth electrode cap engaging means.

13. The apparatus of claim 12 wherein the pivotally mounting means comprises:
means for biasing the discharge end of the chute means to the first position; and
wherein the welding electrode urges the discharge end of the chute means to the second position as the welding electrode moves into an electrode cap mounting position.

14. The apparatus of claim 6 further comprising:
a mounting plate;
the electrode cap removing apparatus and the electrode cap mounting apparatus being mounted on the mounting plate.

15. An apparatus for mounting a new welding electrode cap on a welding electrode comprising:

linear drive means having a reciprocally extendible and retractable drive member;
first and second electrode cap engaging means, each having first and second ends, the first and second electrode cap engaging means disposed in opposed, inverted positions with respect to each other and pivotally connected at the first ends to the linear drive means;
a body, the body having a through bore through which the drive member reciprocally extends;
first and second cam means formed in the first and second electrode cap engaging means, respectively, the first and second cam means being disposed in opposed, inverted relationship with respect to each other;
cam follower means, mounted on the drive member and engaging the first and second cam means, for pivoting the first and second electrode cap engaging means between a first, spaced apart, open position and a second position wherein the first and second electrode cap engaging means are adapted to engage and forcibly mount an electrode cap on a welding electrode; and
pusher means, mounted on each of the first and second electrode cap engaging means, for pushing a new electrode cap engaging means onto the welding electrode as the first and second electrode cap engaging means pivot to the second position.

16. The apparatus of claim 15 wherein:
each of the first and second electrode cap engaging means includes first and second spaced arms, each of the first and second spaced arms having a first end;
the first ends of each of the first and second spaced arms being pivotally connected to the body; and
the first and second cam means comprising:
first and second identical, spaced cams formed in each of the first and second arms of each of the first and second electrode cap engaging means.

17. The apparatus of claim 16 wherein each of the first and second cam means comprises:
a cam track having a central linear portion; and
first and second end portions angularly disposed with respect to the central linear portion and inverted from each other.

18. The apparatus of claim 16 wherein the cam follower means comprises:
a pin mounted on the drive member, the pin having first and second ends extending outward from opposite sides of the drive member; and
cam follower members mounted on each of the first and second ends of the pin for engaging the first and second cam means formed in the first and second electrode cap engaging means.

19. The apparatus of claim 15 wherein the linear drive means comprises:
a fluid operated cylinder; and
the drive member comprises a cylinder rod extensibly and retractably mounted in the cylinder and extending outward from the cylinder.

20. The apparatus of claim 15 further comprising:
chute means for storing a plurality of serially arranged electrode caps, the chute means having a cap discharge end with opposed, open side walls; and
the discharge end being selectively alignable with one of the third and fourth electrode cap engaging means in the electrode cap mounting apparatus for mounting an electrode cap positioned in the discharge end of the chute means onto a welding electrode.

21. The apparatus of claim 20 wherein the chute means comprises:
   a hollow, elongated member with closed top, bottom and chute means comprises:
   a hollow, elongated member with closed top, bottom and opposed side walls; and
   means for pivotally mounting the elongated member to the body such that the discharge end of the elongated member is movable between a first position spaced from one of the first and second electrode cap engaging means and a second position aligned with one of the first and second electrode cap engaging means.

22. The apparatus of claim 21 wherein the pivotally mounting means comprises:
   means for biasing the discharge end of the chute means to the first position; and
   wherein the welding electrode urges the discharge end of the chute means to the second position as the welding electrode moves into an electrode cap mounting position.

* * * * *